United States Patent
Esayian, Jr. et al.

(10) Patent No.: US 10,003,853 B2
(45) Date of Patent: Jun. 19, 2018

(54) SYSTEM AND METHODS FOR VERIFYING AND DISPLAYING A VIDEO SEGMENT VIA AN ONLINE PLATFORM

(71) Applicant: ONE GOLD TOOTH, LLC, La Jolla, CA (US)

(72) Inventors: Nicholas J. Esayian, Jr., Rancho Santa Fe, CA (US); Alan Ezeir, La Jolla, CA (US); Jay Schirmacher, San Diego, CA (US)

(73) Assignee: One Gold Tooth, LLC, La Jolla, CA (US)

( * ) Notice: Subject to any disclaimer, the term of this patent is extended or adjusted under 35 U.S.C. 154(b) by 62 days.

(21) Appl. No.: 15/099,478

(22) Filed: Apr. 14, 2016

(65) Prior Publication Data

US 2017/0303002 A1    Oct. 19, 2017

(51) Int. Cl.
*H04N 21/475*    (2011.01)
*H04N 21/4782*    (2011.01)
*H04N 21/2668*    (2011.01)

(52) U.S. Cl.
CPC ..... *H04N 21/4758* (2013.01); *H04N 21/2668* (2013.01); *H04N 21/4782* (2013.01)

(58) Field of Classification Search
CPC ..................................................... G06Q 50/01
USPC ............................................................ 705/319
See application file for complete search history.

(56) References Cited

U.S. PATENT DOCUMENTS

| 8,954,040 | B2 | 2/2015 | Granat | |
|---|---|---|---|---|
| 2007/0073687 | A1* | 3/2007 | Terrill | G06Q 50/01 |
| 2013/0117364 | A1* | 5/2013 | Bania | G06Q 30/02 |
| | | | | 709/204 |
| 2013/0335509 | A1 | 12/2013 | Cafferata | |
| 2014/0188997 | A1 | 7/2014 | Schneiderman | |
| 2016/0162513 | A1* | 6/2016 | Madjar | G06F 17/30268 |
| | | | | 707/722 |
| 2017/0212917 | A1* | 7/2017 | Chiesa | G06F 17/30303 |

OTHER PUBLICATIONS

Jordan Cook, Oct. 15, 2013, "MeetMe Launches Standalone Dating App Charm, Where Tinder Meets Vine", URL: http://techcrunch.com/2013/10/15/meetme-launches-standalone-dating-app-charm-where-tinder-meets-vine/ 9 pages.

* cited by examiner

*Primary Examiner* — Michael R Telan
(74) *Attorney, Agent, or Firm* — Sheppard Mullin Richter & Hampton LLP

(57) ABSTRACT

A first set of questions to elicit a response from a first user may be obtained. In response to a selection of at least one question from the first set of questions, a first video segment may be obtained. A first capture date when the first video segment was captured may be obtained. The first capture date may be verified that it is within a threshold time period. If the first capture date is verified, the first video segment may be associated with a first profile associated with the first user. At least a portion of the first profile including the first video segment may be displayed via the online platform. A first selection may be received from a second client computing platform associated with a second user viewing the first profile. The first selection may indicate a binary interest for the first user based upon the first profile.

18 Claims, 6 Drawing Sheets

SYSTEM AND METHODS FOR VERIFYING AND DISPLAYING A VIDEO SEGMENT VIA AN ONLINE PLATFORM

FIELD

The disclosure relates to systems and methods for verifying and displaying a video segment via an online platform.

BACKGROUND

A common problem with user profiles of online platforms is that photos of the user may be outdated causing an inaccurate depiction of the user to others. Alternatively, while the photos may be recent, the photos themselves may be an inaccurate depiction of the user. A user may provide information and photos to include within a user profile of online platforms, but the information is often written and because still photographs are static, other users may not hear the user's voice or observe his or her mannerisms.

SUMMARY

One aspect of the disclosure related to a system for verifying and displaying a video segment via an online platform, in accordance with one or more implementations. The online platform may include an online dating platform, a social networking platform, and/or any other online platform. The system may provide a first set of questions to elicit a response from a first user. In response to a selection of at least one question from the first set of questions, the system may obtain a first video segment from a first client computing platform. The first video segment may include a response to the question selected from the first set of questions. The system may obtain a first capture date associated with the first video segment. The first capture date may indicate a date when the first video segment was captured. The first capture date may be verified to determine how recently the first video segment was captured. To verify the first capture date, the system may determine whether the first capture date is within a threshold time period. If the first capture date is verified such that the first video segment was captured within a threshold time period, the system may associate the first video segment with a first profile associated with the first user. At least a portion of the first profile including the first video segment may be displayed via the online platform. The first profile may be presented to a second user via a second client computing platform. The first user may be referred to as a potential match for the second user. A first selection may be received from the second client computing platform associated with the second user. The first selection may indicate a binary interest for the first user based upon the first profile. The binary interest may indicate whether the second user is interested or not interested in the first user. If the first user and the second user are both mutually interested in one another (e.g., the first user is interested in the second user and the second user is interested in the first user), a connection and/or match may be formed between the first user and the second user. The system may receive inputs (e.g., questions, comments, etc.) from one of the matched pair of users for the other matched user in order to elicit a video response. This may help ensure a user that the user knows who he or she is communicating with. A video segment that has been verified as having been recently captured and/or recorded, or at least captured and/or recorded within a certain amount of time from the present moment, may provide a more accurate depiction of what the user looks like, speaks like, acts, behaves, etc.

In some implementations, the system may include one or more servers. The one or more servers may be configured to communicate with one or more client computing platform(s) according to a client/server architecture. The users of the system may access the online platform via one or more client computing platform(s). Client computing platform(s) may include one or more of a cellular telephone, a smartphone, a digital camera, a laptop, a tablet computer, a desktop computer, a television set-top box, a smart TV, a gaming console, and/or other client computing platforms. The server(s) may be configured to execute one or more computer program components. The computer program components may include one or more of an authentication component, a question component, a video segment component, a capture date component, a verification component, a profile component, a display component, a selection component, a determination component, an input component, and/or other components.

The authentication component may be configured to authenticate individual users of the online platform. The authentication component may be configured to require individual users to log into the online platform with a username and password. For example, the authentication component may be configured to authenticate a first user accessing the online platform via a first client computing platform (e.g., one of client computing platform(s)) and/or a second user accessing the online platform via a second client computing platform (e.g., one of client computing platform(s)). The online platform may include a dating platform, a networking platform, a media platform, and/or other online platforms. The online platform may be used to meet and/or communicate with other individuals based upon various factors including user information, user location, user preferences, user interests, and/or other factors. Example online platforms may include Match.com, Facebook, Twitter, Pinterest, LinkedIn, Google+, Vine, Instagram, Snapchat, and/or other online platforms.

The question component may be configured to provide a first set of questions to elicit a response from the first user. The first set of questions may include a list of questions to elicit a response from the first user such that information included within the response to one or more questions from the first set of questions may be included within the first profile associated with the first user. The question component may be configured to randomly generate the first set of questions by including a predetermined number of questions randomly selected from a list of questions stored within an electronic storage and/or other storage. Some or all of the questions included within the first set of questions may be the same and/or different for different users of the online platform.

In response to a selection of at least one question from the first set of questions via the first client computing platform associated with the first user, the video segment component may be configured to obtain a first video segment from the first client computing platform. The first video segment may include a video recording of the first user answering the at least one question selected from the first set of questions. The first video segment may be recorded via the online platform. The first video segment may be obtained from a repository of video segments. While the present disclosure may be directed to video segments, one or more other implementations of the system may be configured for other types of media items. Other types of media items may include one or more of audio files (e.g., audio recordings, etc.), multimedia presentations, photos, slideshows, and/or other media files.

The capture date component may be configured to obtain capture dates of individual images and/or video segments included within individual user profiles of the online platform. The capture date may indicate when a particular image and/or video segment was captured. For example, the capture date component may be configured to obtain a first capture date associated with the first video segment. The first capture date may indicate a date when the first video segment was captured. If the first video segment was captured in real-time via the online platform, the video segment component may be configured to store the date and time stamp of when the first video segment was captured. The capture date component may be configured to obtain the first capture date of the first video segment stored via the electronic storage and/or other external storage. If the first video segment was recorded prior to receiving the selection of the at least one question from the first set of questions, the capture date component may be configured to determine and/or obtain the first capture date based upon metadata associated with the first video segment.

The verification component may be configured to verify that the first capture date is within a threshold time period. The threshold time period may be a predefined threshold time period based upon a unit of time. The predefined threshold time period may be any number of hours, days, weeks, months, years, etc. For example, the predefined threshold time period may be 6 hours, 3 days, or any other predefined length of time. The threshold time period may be automatically predefined by the system and/or may be specific to individual users of the online platform based upon individual user preferences for the threshold time period. User preferences for the threshold time period may be selected by the user during creation of the user profile and stored with the user profile. User preferences for the threshold time period may be updated after creation of the user profile. For example, the system may receive a selection and/or indication from the first user that the first user may prefer images and/or video segments that were captured within 2 weeks of the present date and time that the first user is accessing the system. This may apply to an image and/or the first video segment of the first user profile associated with the first user and/or may apply to other images and/or video segments of other users of the online platform. If users do not indicate a preference for the threshold time period, a default threshold time period may be automatically defined by the system.

If the verification component determines that the first video segment was captured within the threshold time period (e.g., the first capture date is within the threshold time period), the profile component may be configured to associate the first video segment with the first profile associated with the first user. If the first user is creating a new user profile, the profile component may be configured to generate the first profile for the first user and associate the first video segment with the first profile. The first video segment may be updated at a later time, at which point the profile component may be configured to associate the updated first video segment with the first profile of the first user. While individual user profiles have been discussed herein to include a video segment of the user associated with the user profile, user profiles may also include images that the user has chosen to upload and include within the user profile.

The display component may be configured to display at least a portion of the first profile via the online platform. Displaying a portion of the first profile may include displaying the first video segment. The display component may be configured to automatically play the first video segment upon display of the first video segment. The display component may be configured to play the first video segment upon receiving an indication from one or more computing platform(s) to play the first video segment (e.g., receiving an indication from one or more computing platform(s) that a user associated with the one or more client computing platform(s) clicked a play button, tapped a play button, etc.).

Upon creation of a profile, individual users of the online platform may view other user profiles associated with other users of the online platform. Other users of the online platform may be referred to as potential matches. The display component may be configured to queue other user profiles to display to a particular user viewing the other user profiles based upon any number of factors including, but not limited to, user preferences of the user viewing the other user profiles (e.g., age preferences, gender preferences, location preferences, etc. stored within the user profile associated with the user viewing the other user profiles), a location of the user viewing the other user profiles, individual locations of the other user profiles at the time the user viewing the other profiles is accessing the online platform, user preferences for how recently images and/or video segments of the other user profiles have been captured (e.g., the video segment must have been captured within 5 days of the present date), how recently the other users have accessed the online platform, and/or any other factors.

The selection component may be configured to receive a first selection from the second client computing platform associated with the second user. The first selection may indicate a binary interest for the first user based upon the first profile. The binary interest may indicate whether the second user is interested or not interested in the first user based upon the first profile. For example, the second user may view the first profile associated with the first user via a user interface. The second user may view images and/or the first video segment associated with the first profile via the user interface. The selection component may be configured to receive the first selection from the second client computing platform associated with the second user indicating whether the second user is interested or not interested in the first user based upon the first profile.

If two individual users indicate that they are mutually interested, the system may match the two individual users. For example, if the selection component receives a first selection that the second user is interested in the first user and the selection component receives a second selection that the first user is interested in the second user, the system may match the first user and the second user.

The system may be configured to allow individual users that are matches to communicate with one another via the online platform. Individual users of a match may communicate with one another via a chat capability available via the online platform. The input component may be configured to receive an input from the first client computing platform for the second user. An input may include a written question, a written comment, an emoji, an image, an audio file, a video segment, and/or any other form of communication. The input component may be configured to receive the input via the chat capability. The input component may be configured to effectuate transmission of the input to the second profile associated with the second user which may be accessed by the second client computing platform.

In response to the input from the first client computing platform, the video segment component may be configured to obtain a third video segment from the second client computing platform. The third video segment may include a response to the input from the first user (e.g., a question, remark, comment, etc.). The capture date component may obtain a third capture date associated with the third video segment. The third capture date may indicate when the third video segment was captured. the verification component may verify that the third capture date is within the threshold time period. If the third capture date is verified, the input component may effectuate transmission of the third video segment to the first client computing platform.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
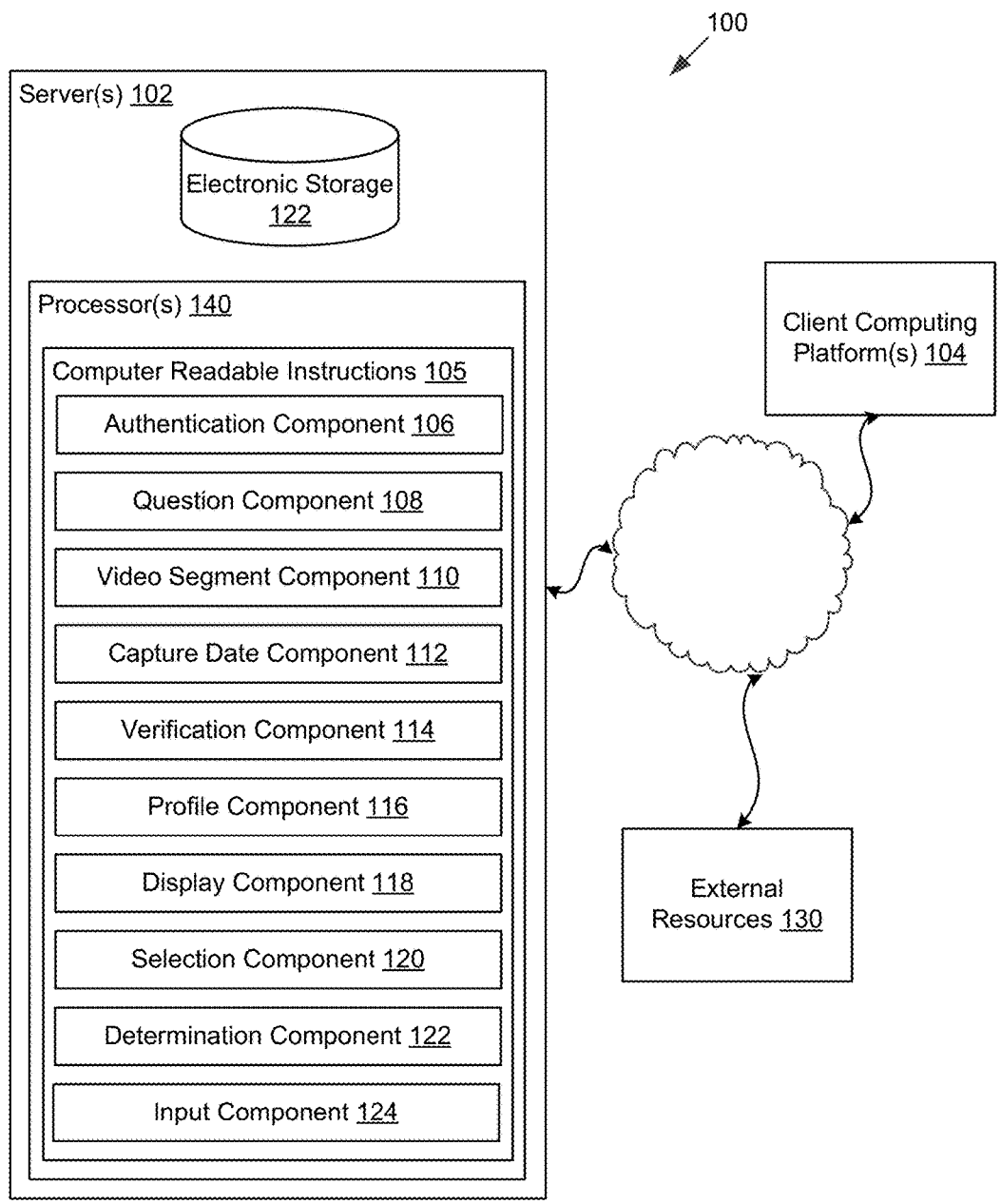
FIG. 1 illustrates a system for verifying and displaying a video segment via an online platform, in accordance with one or more implementations.

FIG. 1 illustrates a system 100 for verifying and displaying a video segment via an online platform, in accordance with one or more implementations. The online platform may include an online dating platform, a social networking platform, and/or any other online platform. System 100 may provide a first set of questions to elicit a response from a first user. In response to a selection of at least one question from the first set of questions, system 100 may obtain a first video segment from a first client computing platform. The first video segment may include a response to the question selected from the first set of questions. System 100 may obtain a first capture date associated with the first video segment. The first capture date may indicate a date when the first video segment was captured. The first capture date may be verified to determine how recently the first video segment was captured. To verify the first capture date, system 100 may determine whether the first capture date is within a threshold time period. If the first capture date is verified such that the first video segment was captured within a threshold time period, system 100 may associate the first video segment with a first profile associated with the first user. At least a portion of the first profile including the first video segment may be displayed via the online platform. The first profile may be presented to a second user via a second client computing platform. The first user may be referred to as a potential match for the second user. A first selection may be received from the second client computing platform associated with the second user. The first selection may indicate a binary interest for the first user based upon the first profile. The binary interest may indicate whether the second user is interested or not interested in the first user. If the first user and the second user are both mutually interested in one another (e.g., the first user is interested in the second user and the second user is interested in the first user), a connection and/or match may be formed between the first user and the second user. System 100 may receive inputs (e.g., questions, comments, etc.) from one of the matched pair of users for the other matched user in order to elicit a video response. This may help ensure a user that the user knows who he or she is communicating with. A video segment that has been verified as having been recently captured and/or recorded, or at least captured and/or recorded within a certain amount of time from the present moment, may provide a more accurate depiction of what the user looks like, speaks like, acts, behaves, etc.

As is illustrated in FIG. 1, system 100 may include one or more server(s) 102. Server(s) 102 may be configured to communicate with one or more client computing platform(s) 104 according to a client/server architecture. The users of system 100 may access the online platform via one or more client computing platform(s) 104. Client computing platform(s) 104 may include one or more of a cellular telephone, a smartphone, a digital camera, a laptop, a tablet computer, a desktop computer, a television set-top box, a smart TV, a gaming console, and/or other client computing platforms. Server(s) 102 may be configured to execute one or more computer program components. The computer program components may include one or more of authentication component 106, question component 108, video segment component 110, capture date component 112, verification component 114, profile component 116, display component 118, selection component 120, determination component 122, input component 124, and/or other components.

Authentication component 106 may be configured to authenticate individual users of the online platform. Authentication component 106 may be configured to require individual users to log into the online platform with a username and password. For example, authentication component 106 may be configured to authenticate a first user accessing the online platform via a first client computing platform (e.g., one of client computing platform(s) 104) and/or a second user accessing the online platform via a second client computing platform (e.g., one of client computing platform(s) 104). The online platform may include a dating platform, a networking platform, a media platform, and/or other online platforms. The online platform may be used to meet and/or communicate with other individuals based upon various factors including user information, user location, user preferences, user interests, and/or other factors. Example online platforms may include Match.com, Facebook, Twitter, Pinterest, LinkedIn, Google+, Vine, Instagram, Snapchat, and/or other online platforms.

The online platform may include profiles associated with individual users of the online platform. Authentication component 106 may manage profiles associated with users of the online platform. Individual user profiles may include user information associated with individual users of the online platform. User information may include one or more of information identifying users (e.g., a username or handle, a number, an identifier, and/or other identifying information), security login information (e.g., a login code or password, a user ID, and/or other information necessary for the user to access server(s) 102), system usage information, external usage information (e.g., usage of one or more applications external to system 100 including one or more of online activities such as in social networks and/or other external applications), subscription information, a location of the user, an age of the user, photos and/or videos that the user has provided to include within the user profile, a client computing platform identification associated with the user, a phone number associated with the user, privacy settings information, and/or other information related to users of the online platform. User information may include information stored by client computing platform(s) 104, server(s) 102 (e.g., electronic storage 122), and/or other storage locations.

Authentication component 106 may be configured to obtain user information via one or more client computing platform(s) 104 (e.g., user input via a user interface, etc.). If a user does not have a preexisting user profile associated with the online platform, the user may register to receive services provided by system 100 via a website, web-based application, mobile application, and/or user application. Authentication component 106 may be configured to create a user ID and/or other identifying information for a user when the user registers. The user ID and/or other identifying information may be associated with one or more client computing platform(s) 104 used by the user. Authentication component 106 may be configured to store such association with the user profile of the user. The user may associate one or more accounts associated with other social network services, messaging services, and the like with the user profile provided by the online platform.

Figures 2A, 2B:
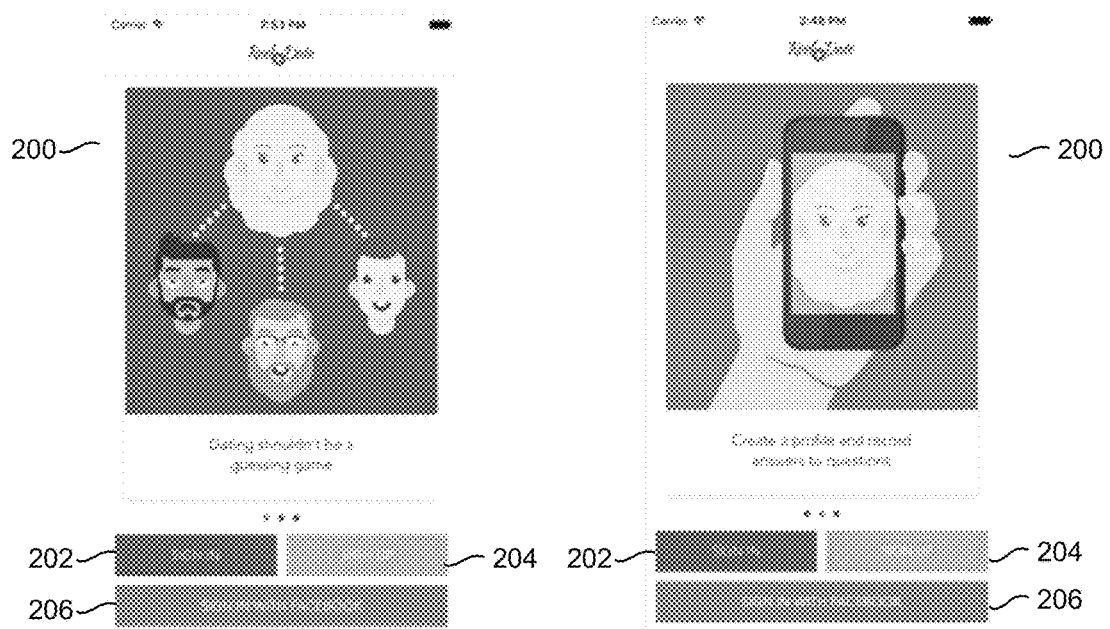
FIGS. 2A-2B illustrate an exemplary user interface of the online platform, in accordance with one or more implementations.

Referring to FIGS. 2A and 2B, authentication component 106 may effectuate presentation of user interface 200 associated with the online platform via the first client computing (e.g., one of client computing platform(s) 104) and/or the second client computing platform (e.g., one of client computing platform(s) 104). As shown in FIGS. 2A and 2B, if the first user has a preexisting user profile stored via system 100, the first user may select (e.g., click, tap, etc.) "SIGN IN" button 202 via the first client computing platform to access the user profile (e.g., the first profile) associated with the first user. Alternatively, if the first user has not previously created a user profile via system 100, the first user may select "SIGN UP" button 204 via the first client computing platform to create a user profile (e.g., the first profile). The second user and/or any other user and/or potential user of the online platform may view user interface 200, access his or her user profile via "SIGN IN" button 202, and/or create a new profile via "SIGN UP" button 204 in a similar manner. While "sign in" and "sign up" have been used to denote buttons 202 and 204 respectively, these are meant for exemplary purposes only and not meant to be a limitation of the disclosure. For example, button 202 may be called "log in" and/or button 204 may be called "create a profile". Authentication component 106 may be configured to sign in to an existing user profile and/or create a new user profile via user information accessed from an external online platform (e.g., other online platforms). For example, a user profile for the online platform may be created and/or an existing user profile associated with the online platform may be accessed using user information obtained from Facebook, as shown by "SIGN IN WITH FACEBOOK" button 206. While Facebook is used as an example in FIGS. 2A and 2B, this is not meant to be a limitation of this disclosure, as any other external online platform may be accessed.

Referring back to FIG. 1, question component 108 may be configured to provide a first set of questions to elicit a response from the first user. For example, if the first user of the online platform has not created a user profile, the first user via the first client computing platform may click on "SIGN UP" button 204 of FIGS. 2A and/or 2B. Authentication component 106 may receive and/or store user information via question component 108 to include within the first profile associated with the first user. For example, the first set of questions may include a list of questions to elicit a response from the first user such that information included within the response to one or more questions from the first set of questions may be included within the first profile associated with the first user. Question component 108 may be configured to randomly generate the first set of questions by including a predetermined number of questions randomly selected from a list of questions stored within electronic storage 122 of FIG. 1 and/or other storage. Some or all of the questions included within the first set of questions may be the same and/or different for different users of the online platform.

Figure 3:
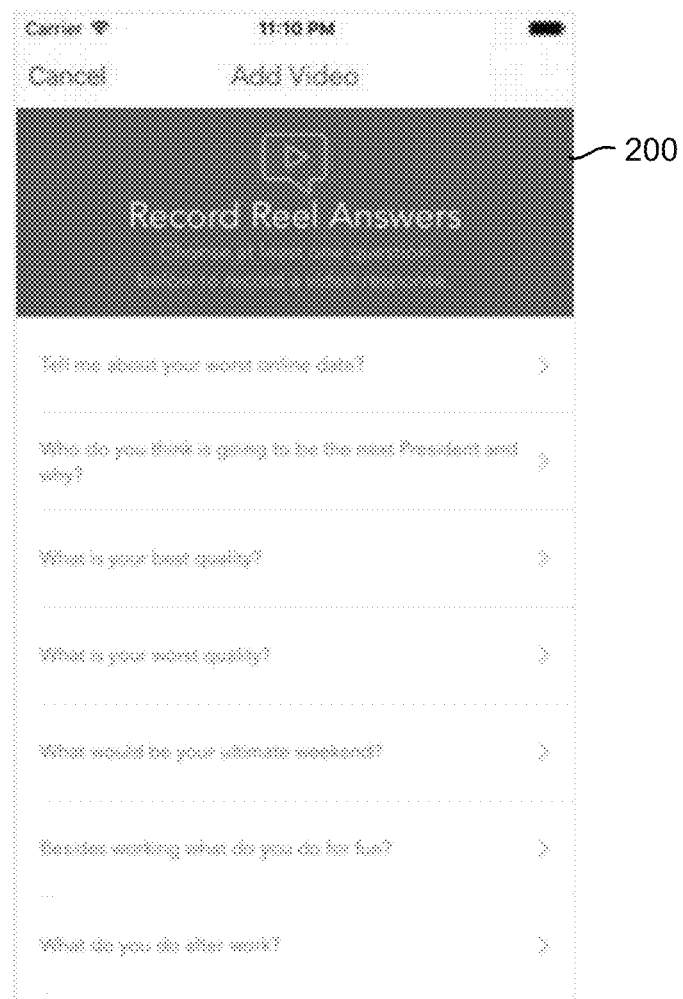
FIG. 3 illustrates an exemplary set of questions to elicit user responses within the online platform, in accordance with one or more implementations.

Referring to FIG. 3, question component 108 may effectuate presentation of the first set of questions via user interface 200. As shown in FIG. 3, examples of questions included within the first set of questions may include, but are not limited to, "Tell me about your worst online date?", "Who do you think is going to be the next President and why?", "What is your best quality", "What is your worst quality?", "What would be your ultimate weekend?", "Besides working what do you do for fun?", and "What do you do after work?" This is not an exhaustive list of questions, as any question may be included within the first set of questions. Presentation of the first set of questions may be displayed via a display of the first client computing platform that the first user may access the online platform and/or system 100 with.

Referring back to FIG. 1, in response to a selection of at least one question from the first set of questions via the first client computing platform associated with the first user, video segment component 110 may be configured to obtain a first video segment from the first client computing platform. As shown in FIG. 3, user interface 200 indicates that the first user may choose and/or select at least one question from the first set of questions to record a video response to the selected at least one question. The first video segment may include a video recording of the first user answering the at least one question selected from the first set of questions. The first video segment may be recorded via the online platform. The first video segment may be obtained from a repository of video segments. While the present disclosure may be directed to video segments, one or more other implementations of system 100 and/or server(s) 102 may be configured for other types of media items. Other types of media items may include one or more of audio files (e.g., audio recordings, etc.), multimedia presentations, photos, slideshows, and/or other media files.

Referring back to FIG. 1, the first video segment may be recorded via the online platform such that the first user may capture a video segment in real-time without accessing a camera roll and/or library of images and/or video segments external to the online platform. In this manner, video segment component 110 may be configured to access a camera and/or sensor associated with the first client computing platform and capture the first video segment via the camera and/or sensor directly through the online platform. Video segment component 110 may be configured to effectuate display of the captured image and/or video segment through the camera and/or sensor via the display of the first client computing platform. The user may use the display to orient the first client computing platform in a manner to capture the video segment. Upon completion of capturing the video segment, video segment component 110 may be configured to provide an option for the first user to save, delete, and/or recapture the video segment. Video segment component 110 may be configured to date and time stamp the captured video segment (e.g., the first video segment) when the video segment was captured. The date and time stamp may be stored as metadata along with the video segment. Video segment component 110 may store the first video segment within electronic storage 122 and/or other external storage.

Video segment component 110 may be configured to receive an indication from the first user via the first client computing platform that the first user would like to upload an existing video segment stored within the first client computing platform. Video segment component 110 may be configured to access a camera roll and/or library of images and/or video segments stored within client computing platform(s) 104, server(s) 102, and/or other storage locations where video segments may be stored. Video segment component 110 may be configured to effectuate presentation of available images and/or video segments via the display of the first client computing platform. Video segment component 110 may be configured to receive a selection of a video segment from the first client computing platform. Video segment component 110 may store the selected image and/or video segment (e.g., the first video segment) within electronic storage 122 and/or external storage.

Capture date component 112 may be configured to obtain capture dates of individual images and/or video segments included within individual user profiles of the online platform. The capture date may indicate when a particular image and/or video segment was captured. For example, capture date component 112 may be configured to obtain a first capture date associated with the first video segment. The first capture date may indicate a date when the first video segment was captured. As discussed above, if the first video segment was captured in real-time via the online platform, video segment component 110 may be configured to store the date and time stamp of when the first video segment was captured. Capture date component 112 may be configured to obtain the first capture date of the first video segment stored via electronic storage 122 and/or other external storage. If the first video segment was recorded prior to receiving the selection of the at least one question from the first set of questions and uploaded via system 100, capture date component 112 may be configured to determine and/or obtain the first capture date based upon metadata associated with the first video segment.

Verification component 114 may be configured to verify that the first capture date is within a threshold time period. The threshold time period may be a predefined threshold time period based upon a unit of time. The predefined threshold time period may be any number of hours, days, weeks, months, years, etc. For example, the predefined threshold time period may be 6 hours, 3 days, or any other predefined length of time. The threshold time period may be automatically predefined by system 100 and/or may be specific to individual users of system 100 based upon individual user preferences for the threshold time period. User preferences for the threshold time period may be selected by the user during creation of the user profile and stored with the user profile. User preferences for the threshold time period may be updated after creation of the user profile. For example, system 100 may receive a selection and/or indication from the first user that the first user may prefer images and/or video segments that were captured within 2 weeks of the present date and time that the first user is accessing system 100. This may apply to an image and/or the first video segment of the first user profile associated with the first user and/or may apply to other images and/or video segments of other users of the online platform. For example, if the first user accesses system 100 on Mar. 9, 2016 at 5 PM, the first user may only want to see other user profiles of the online platform that include images and/or video segments that were captured within 2 weeks of Mar. 9, 2016 at 5 PM (e.g., the image and/or video segment must have been captured between Feb. 24, 2016 at 5 PM and Mar. 9, 2016 at 5 PM). This may ensure that the first user is viewing recent images and/or video segments of other users of the online platform. If users do not indicate a preference for the threshold time period, a default threshold time period may be automatically defined by system 100.

If verification component 114 determines that the first video segment was not captured within the threshold time period (e.g., the first capture date is not within the threshold time period), verification component 114 may be configured to notify the first user that the first video segment was not captured recently enough and may prompt the first user to recapture and/or upload the first video segment via video segment component 110.

If verification component 114 determines that the first video segment was captured within the threshold time period (e.g., the first capture date is within the threshold time period), profile component 116 may be configured to associate the first video segment with the first profile associated with the first user. If the first user is creating a new user profile, profile component 116 may be configured to generate the first profile for the first user and associate the first video segment with the first profile. The first video segment may be updated at a later time, at which point profile component 116 may be configured to associate the updated first video segment with the first profile of the first user. While individual user profiles have been discussed herein to include a video segment of the user associated with the user profile, user profiles may also include images that the user has chosen to upload and include within the user profile. System 100 may obtain images in a similar manner as described above with reference to video segment component 110.

Display component 118 may be configured to display at least a portion of the first profile via the online platform. Displaying a portion of the first profile may include displaying the first video segment. Display component 118 may be configured to automatically play the first video segment upon display of the first video segment. Display component 118 may be configured to play the first video segment upon receiving an indication from one or more computing platform(s) 104 to play the first video segment (e.g., receiving an indication from one or more computing platform(s) 104 that a user associated with the one or more client computing platform(s) 104 clicked a play button, tapped a play button, etc.).

Displaying a portion of the first profile may include displaying one or more images provided by the first user via the first client computing platform. Displaying a portion of the first profile may include displaying user information included within the first profile associated with the first user.

For example, display component 118 may be configured to display a name and/or alias of the first user, an age of the first user, a description of the first user which the first user provided, a current location of the first user, and/or other user information included within the first profile associated with the first user. The first user may restrict which user information is displayed to other users of the online platform and which user information is not displayed.

Figure 4:
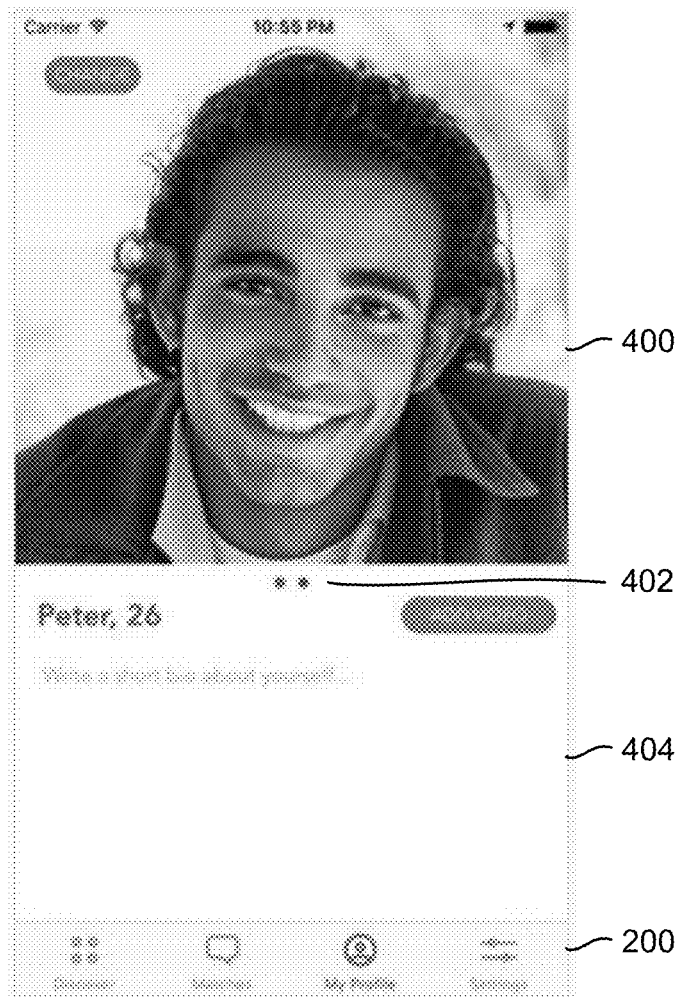
FIG. 4 illustrates an exemplary user profile of the online platform, in accordance with one or more implementations.

Referring to FIGS. 1 and 4, user interface 200 is shown with a display of at least a portion of the first profile (e.g., profile 400) including an image and/or video segment of the first user, a name and/or alias of the first user (e.g., Peter), and an age of the first user (e.g., Peter is 26). Display component 118 may be configured to display dots 402 below a displayed image and/or video segment to denote a number of images and/or video segments included and/or available for display within profile 400. In this example, two dots 402 are displayed, indicating that two images and/or video segments included within profile 400 are available for display. Display component 118 may be configured to display other available images and/or video segments of profile 400 by receiving an indication from one or more client computing platform(s) 104 of FIG. 1 to display the other images and/or video segments available within profile 400 (e.g., swiping, clicking, tapping, selecting, and/or providing other indications). Display component 118 may be configured to display description 404 included within profile 400. The first user may update the first profile associated with the first user via user interface 200. While FIG. 4 is an example display of a user profile associated with a user of the online platform, this is not meant to be a limitation of this disclosure, as other information and/or variations of the display may be provided. As discussed above, display component 118 may be configured to display any user information provided by the first user included within the first profile associated with the first user. The first user may restrict which user information is displayed to other users of the online platform and which user information is not displayed.

Displaying at least a portion of the first profile may include displaying the first capture date of the first video segment. While not shown in FIG. 4, display component 118 may be configured to display, via user interface 200, the first capture date that capture date component 112 obtained. The first capture date may be displayed anywhere within profile 400. This may provide users viewing profile 400 with notice of how recently the image and/or the first video segment was captured. For example, if the first video segment was captured on Mar. 9, 2016 at 5 PM, display component 118 may be configured to display "Mar. 9, 2016 at 5 PM" or some variation of that date and time within the image and/or the first video segment, near the image and/or the first video segment, and/or any other location within profile 400 of user interface 200.

Referring back to FIG. 1, any number of users may join the online platform and/or create profiles in a similar manner as described above. For example, authentication component 106 may be configured to authenticate a second user associated with a second client computing platform. If the second user does not have an existing account and/or profile (e.g., a second profile), system 100 may create the second profile with user information provided by the second user and/or user information extracted from other online platforms and/or applications. In a similar manner as discussed above, question component 108 may be configured to provide a second set of questions to elicit a response from the second user. The second set of questions may include all, some, or none of the same questions included within the first set of questions. In response to a selection of at least one question from the second set of questions, video segment component 110 may obtain a second video segment from the second client computing platform in a similar manner as discussed above. Capture date component 112 may be configured to obtain a second capture date associated with the second video segment. The second capture date may indicate a date when the second video segment was captured. Verification component 114 may be configured to verify that the second capture date is within the threshold time period. If the second capture date is verified, profile component 116 may be configured to associate the second video segment with a second profile associated with the second user. In a similar manner as discussed above, display component 118 may be configured to display at least a portion of the second profile, including the second video segment via the online platform. This may be repeated for any number of users of the online platform.

Upon creation of a profile, individual users of the online platform may view other user profiles associated with other users of the online platform. Other users of the online platform may be referred to as potential matches. Display component 118 may be configured to queue other user profiles to display to a particular user viewing the other user profiles based upon any number of factors including, but not limited to, user preferences of the user viewing the other user profiles (e.g., age preferences, gender preferences, location preferences, etc. stored within the user profile associated with the user viewing the other user profiles), a location of the user viewing the other user profiles, individual locations of the other user profiles at the time the user viewing the other profiles is accessing the online platform, user preferences for how recently images and/or video segments of the other user profiles have been captured (e.g., the video segment must have been captured within 5 days of the present date), how recently the other users have accessed the online platform, and/or any other factors.

Selection component 120 may be configured to receive a first selection from the second client computing platform associated with the second user. The first selection may indicate a binary interest for the first user based upon the first profile. The binary interest may indicate whether the second user is interested or not interested in the first user based upon the first profile. For example, the second user may view the first profile associated with the first user via user interface 200. The second user may view images and/or the first video segment associated with the first profile via user interface 200. Selection component 120 may be configured to receive the first selection from the second client computing platform associated with the second user indicating whether the second user is interested or not interested in the first user based upon the first profile. Selection component 120 may be configured to store the first selection (e.g., interested or not interested) of the second user for the first user.

In a similar manner as discussed above, selection component 120 may be configured to receive any number of selections of binary interest from any number of users of the online platform for other users of the online platform. For example, selection component 120 may be configured to receive a second selection from the first client computing platform associated with the first user. The second selection may indicate a binary interest for the second user based upon the second profile. For example, the first user may view the second profile associated with the second user via user interface 200. The first user may view images and/or the second video segment associated with the second profile via user interface 200. Selection component 120 may be configured to receive the second selection from the first client computing platform associated with the first user indicating whether the first user is interested or not interested in the second user based upon the second profile. Selection component 120 may store the second selection (e.g., interested or not interested) of the first user for the second user. This process may be repeated for any number of users.

Figure 5:
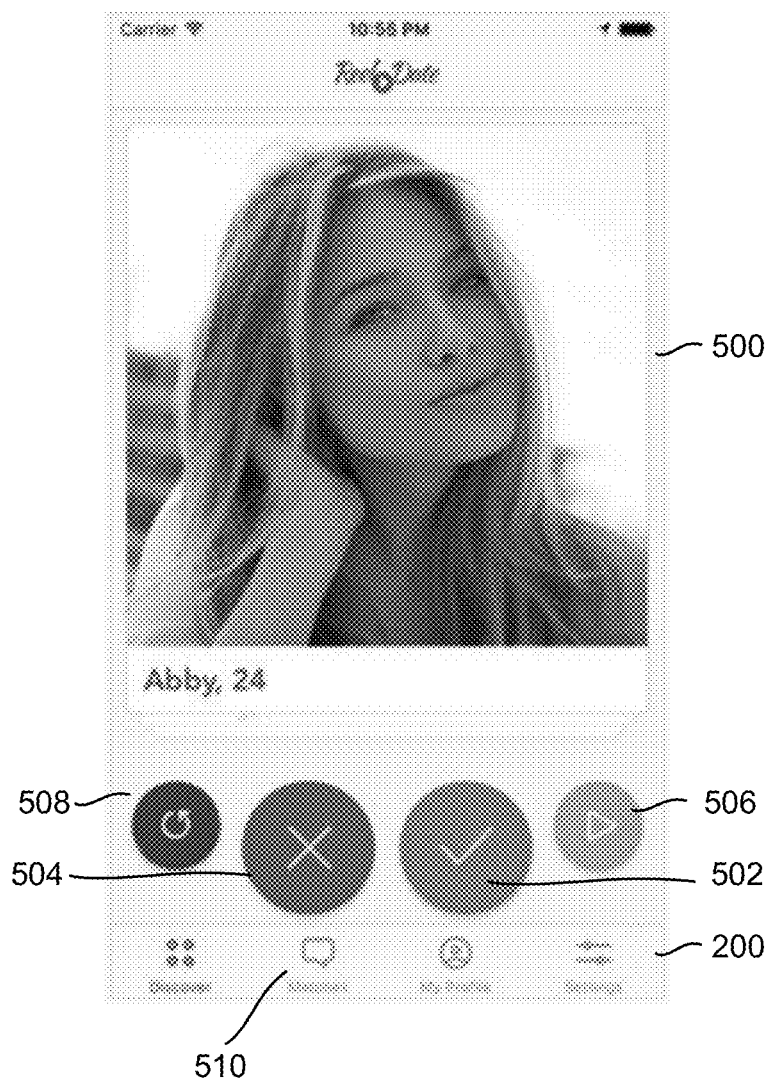
FIG. 5 illustrates an exemplary potential match within the online platform, in accordance with one or more implementations.

Referring to FIGS. 1 and 5, display component 118 may be configured to display a preview of profile 500 (e.g., the second profile associated with the second user) via user interface 200. User interface 200 is shown with a display of at least a portion of the second profile (e.g., preview of profile 500) including an image and/or video segment of the second user, a name and/or alias of the second user (e.g., Abby), and an age of the second user (e.g., Abby is 24). The display of the preview of profile 500 may include a button denoting interested (e.g., button 502) and a button denoting not interested (e.g., button 504). The display of the preview of profile 500 may include a button to play (e.g., button 506) and/or replay (e.g., button 508) a video segment included within the preview of profile 500. If the preview of the second profile (e.g., preview of profile 500) is being displayed for the first user, display component 118 may be configured to receive an indication from the first client computing platform associated with the first user to view the full profile associated with the second profile (e.g., tapping, clicking, selecting, and/or other indications to view the full profile). While display of the full profile of the second profile is not shown, it may be similar to profile 400 of FIG. 4. Display of the full profile of profile 500 to the first user may include buttons 502, 504, 506, and/or 508 in addition to user information included within the second profile. Selection component 120 may be configured to receive, from the first client computing platform associated with the first user, a second selection of interested or not interested for the second user based upon the second profile via buttons 502 and/or 504.

If two individual users indicate that they are mutually interested, system 100 may match the two individual users. For example, if selection component 120 receives a first selection that the second user is interested in the first user and selection component 120 receives a second selection that the first user is interested in the second user, system 100 may match the first user and the second user. A user may view his or her matches via the "Matches" button (e.g., button 510) via user interface 200.

System 100 may be configured to allow individual users that are matches to communicate with one another via system 100. Individual users of a match may communicate with one another via a chat capability available via the online platform. Input component 124 may be configured to receive an input from the first client computing platform for the second user. An input may include a written question, a written comment, an emoji, an image, an audio file, a video segment, and/or any other form of communication. Input component 124 may be configured to receive the input via the chat capability. Input component 124 may be configured to effectuate transmission of the input to the second profile associated with the second user which may be accessed by the second client computing platform.

In response to the input from the first client computing platform, video segment component 110 may be configured to obtain a third video segment from the second client computing platform. The third video segment may be obtained in a similar manner as described above with reference to obtaining the first video segment and/or the second video segment. The third video segment may include a response to the input from the first user (e.g., a question, remark, comment, etc.).

Capture date component 112 may be configured to obtain a third capture date associated with the third video segment. The third capture date may indicate a date when the third video segment was captured. Capture date component 112 may obtain the third capture date in a similar manner as described above with reference to obtaining the first capture date and/or the second capture date.

Verification component 114 may verify that the third capture date is within the threshold time period. Verification component 114 may verify the third capture date in a similar manner as described above with reference to verifying the first capture date and/or the second capture date. The threshold time period may include the date and/or time that input component 124 received the input from the first client computing platform, the date and/or time that input component 124 transmitted the input to the second client computing platform, the date and/or time that the second user associated with the second client computing platform accessed and/or viewed the input, the threshold time period discussed above with reference to verifying the first capture date and/or the second capture date, and/or any other threshold time period. This may ensure that the third video segment was captured within a certain period of time to verify that it is a recent and/or accurate depiction of the second user and/or captured in response to the input from the first client computing platform.

If the third capture date is verified, input component 124 may be configured to effectuate transmission of the third video segment to the first client computing platform. Video segment component 110 may store the third video segment to electronic storage 122 and/or other storage. Display component 118 may be configured to display the third video segment via the display of the first client computing platform the next time the first user accesses the online platform. Displaying the third video segment may include displaying the third capture date in a similar manner as described above in reference to displaying the first capture date and/or the second capture date. The first user associated with the first client computing platform may view the third video segment via the display of the first client computing platform.

This process may be repeated such that the first user and/or the second user, having been matched, may communicate with one another via the chat capability. The first user and/or the second user may communicate via texts, audio segments, video segments, and/or any other means of communication through system 100. Other users of other matches may communicate with one another in a similar manner.

Once a video segment is verified, uploaded, and/or associated with a user profile, determination component 122 may be configured to determine if the capture date associated with the video segment included within the user profile is still within the threshold time period. For example, if the first video segment associated with the first profile of the first user was captured on Mar. 9, 2016 and the threshold time period is 2 weeks (e.g., 14 days), then on Mar. 24, 2016 (e.g., 15 days after Mar. 9, 2016), the first video segment captured on Mar. 9, 2016 may no longer be within the threshold time period. If it is determined that the first capture date of the first video segment associated with the first profile is not within the threshold time period, profile component 116 may dissociate the first video segment with the first profile. Video segment component 110 may be configured to effectuate transmission of a notification to the first client computing platform associated with the first user the next time the first user accesses the online platform indicating that the first video segment has expired and that the first user should upload a new video segment to associate with the first profile.

Referring again to FIG. 1, in some implementations, server(s) 102, client computing platform(s) 104, and/or external resources 130 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 130 may be operatively linked via some other communication media.

A given client computing platform 104 may include one or more processors configured to execute computer program components. The computer program components may be configured to enable a producer and/or user associated with the given client computing platform 104 to interface with system 100 and/or external resources 130, and/or provide other functionality attributed herein to client computing platform(s) 104. By way of non-limiting example, the given client computing platform 104 may include one or more of a desktop computer, a laptop computer, a handheld computer, a NetBook, a Smartphone, a gaming console, and/or other computing platforms.

External resources 130 may include sources of information, hosts and/or providers of virtual environments outside of system 100, external entities participating with system 100, and/or other resources. In some implementations, some or all of the functionality attributed herein to external resources 130 may be provided by resources included in system 100.

Server(s) 102 may include electronic storage 122, one or more processor(s) 140, and/or other components. Server(s) 102 may include communication lines, or ports to enable the exchange of information with a network and/or other computing platforms. Illustration of server(s) 102 in FIG. 1 is not intended to be limiting. Servers(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may include electronic storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 140, information received from server(s) 102, information received from client computing platform(s) 104, and/or other information that enables server(s) 102 to function as described herein.

Processor(s) 140 may be configured to provide information processing capabilities in server(s) 102. As such, processor(s) 140 may include one or more of a digital processor, an analog processor, a digital circuit designed to process information, an analog circuit designed to process information, a state machine, and/or other mechanisms for electronically processing information. Although processor(s) 140 is shown in FIG. 1 as a single entity, this is for illustrative purposes only. In some implementations, processor(s) 140 may include a plurality of processing units. These processing units may be physically located within the same device, or processor(s) 140 may represent processing functionality of a plurality of devices operating in coordination. The processor(s) 140 may be configured to execute computer readable instruction components 106, 108, 110, 112, 114, 116, 118,120, 122, 124, and/or other components. The processor(s) 140 may be configured to execute components 106, 108, 110, 112, 114, 116, 118, 120, 122, 124, and/or other components by software; hardware; firmware; some combination of software, hardware, and/or firmware; and/or other mechanisms for configuring processing capabilities on processor(s) 140.

It should be appreciated that although components 106, 108, 110, 112, 114, 116, 118, 120, 122, and 124 are illustrated in FIG. 1 as being co-located within a single processing unit, in implementations in which processor(s) 140 includes multiple processing units, one or more of components 106, 108, 110, 112, 114, 116, 118, 120, 122, and/or 124 may be located remotely from the other components. The description of the functionality provided by the different components 106, 108, 110, 112, 114, 116, 118, 120, 122, and/or 124 described herein is for illustrative purposes, and is not intended to be limiting, as any of components 106, 108, 110, 112, 114, 116, 118, 120, 122, and/or 124 may provide more or less functionality than is described. For example, one or more of components 106, 108, 110, 112, 114, 116, 118, 120, 122, and/or 124 may be eliminated, and some or all of its functionality may be provided by other ones of components 106, 108, 110, 112, 114, 116, 118, 120, 122, and/or 124. As another example, processor(s) 140 may be configured to execute one or more additional components that may perform some or all of the functionality attributed herein to one of components 106, 108, 110, 112, 114, 116, 118, 120, 122, and/or 124.

Figure 6:
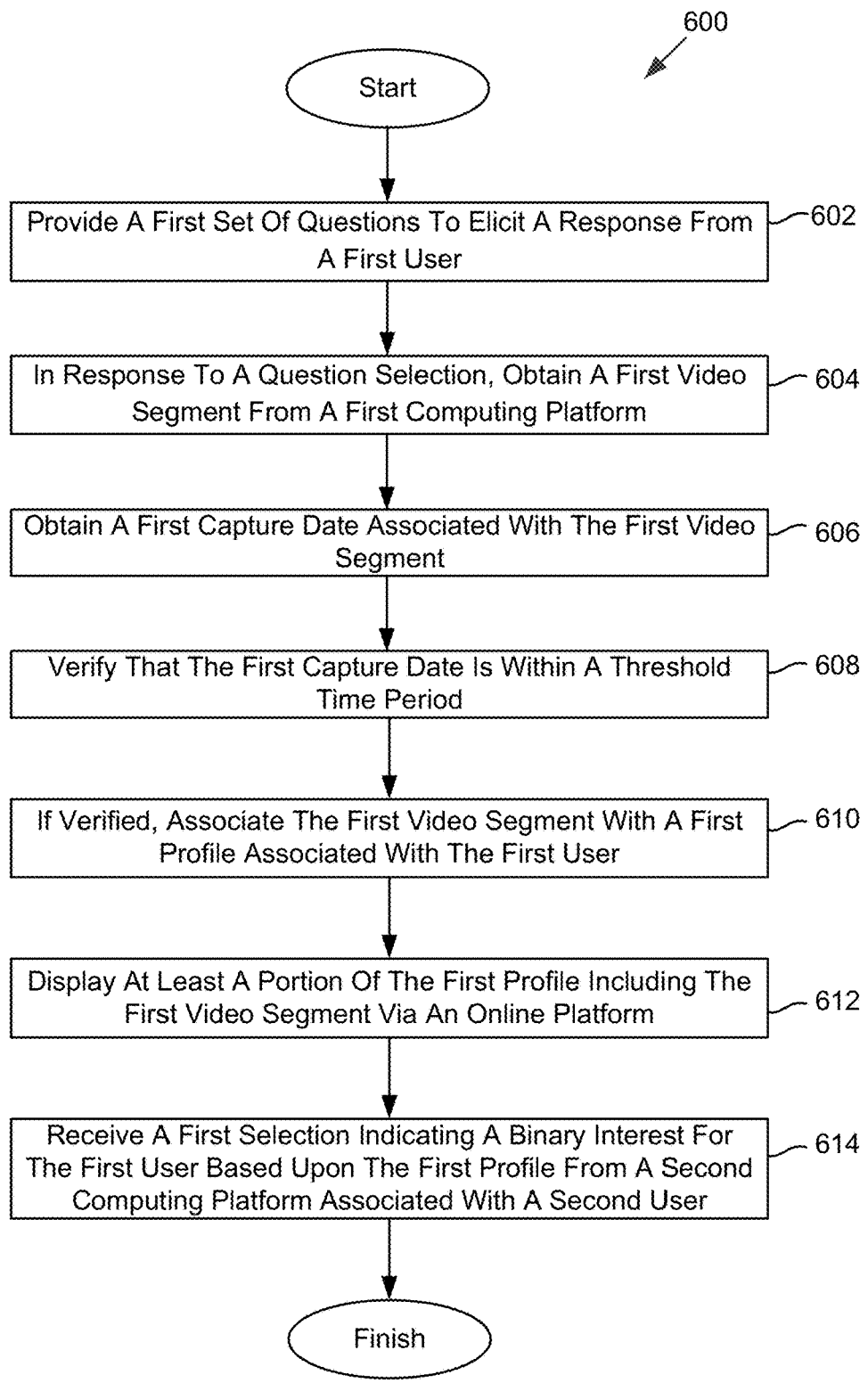
FIG. 6 illustrates a method for verifying and displaying a video segment via an online platform, in accordance with one or more implementations.

FIG. 6 illustrates a method 600 for verifying and displaying a video segment via an online platform, in accordance with one or more implementations. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 6 and described below is not intended to be limiting.

In some implementations, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At an operation 602, a first set of questions may be provided to elicit a response from a first user. Operation 602 may be performed by a question component that is the same as or similar to question component 108, in accordance with one or more implementations.

At an operation 604, in response to a question selection, a first video segment may be obtained from a first client computing platform. Operation 604 may be performed by a video segment component that is the same as or similar to video segment component 110, in accordance with one or more implementations.

At an operation 606, a first capture date associated with the first video segment may be obtained. Operation 606 may be performed by a capture date component that is the same as or similar to capture date component 112, in accordance with one or more implementations.

At an operation 608, the first capture date may be verified that it is within a threshold time period. Operation 608 may be performed by a verification component that is the same as or similar to verification component 114, in accordance with one or more implementations.

At an operation 610, if the capture date is verified, the first video segment may be associated with a first profile associated with the first user. Operation 610 may be performed by a profile component that is the same as or similar to profile component 116, in accordance with one or more implementations.

At an operation 612, at least a portion of the first profile including the first video segment may be displayed via the online platform. Operation 612 may be performed by a display component that is the same as or similar to display component 118, in accordance with one or more implementations.

At an operation 614, a first selection indicating a binary interest for the first user based upon the first profile may be received from a second client computing platform associated with a second user. Operation 614 may be performed by a selection component that is the same as or similar to selection component 120, in accordance with one or more implementations.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for verifying how old a video segment is and for displaying the video segment via an online platform, the system comprising:
   one or more physical computer processors configured by computer readable instructions to:
   provide a first set of questions to elicit a response from a first user;
   in response to a selection, from a first computing platform associated with the first user, of at least one question from the first set of questions, obtain a first video segment captured by the first client computing platform;
   obtain a first capture date associated with the first video segment, the first capture date indicating a date when the first video segment was captured;
   verify that the first capture date is within a threshold time period from current time;
   responsive to the first capture date being verified to be no older than the threshold time period:
      associate the first video segment with a first profile that is associated with the first user;
      display at least a portion of the first profile including the first video segment via the online platform such that a second user can view the first profile; and
      receive a first selection from a second client computing platform associated with the second user viewing the first profile, the first selection indicating a binary interest for the first user based upon the first profile; and
   responsive to the first capture date being verified to be older than the threshold time period:
      dissociate the first video segment with the first profile; and
      remove at least a portion of the first profile such that the first user is notified that the first capture date is older than the threshold time period.

2. The system of claim 1, wherein the first video segment is recorded via the online platform.

3. The system of claim 1, wherein the first video segment is obtained from a repository of video segments.

4. The system of claim 1, wherein displaying at least the portion of the first profile includes displaying the first capture date of the first video segment.

5. The system of claim 1, wherein the binary interest includes interested or uninterested.

6. The system of claim 5, wherein the one or more physical computer processors are further configured to:
   provide a second set of questions to elicit a response from the second user;
   in response to a selection, from the second client computing platform associated with the second user, of at least one question from the second set of questions, obtain a second video segment captured by the second client computing platform;
   obtain a second capture date associated with the second video segment, the second capture date indicating a date when the second video segment was captured;
   verify that the second capture date is within the threshold time period from current time;
   responsive to the second capture date being verified to be no older than the threshold time period:
      associate the second video segment with a second profile that is associated with the second user;
      display at least a portion of the second profile including the second video segment via the online platform such that the first user can view the second profile; and
      receive a second selection from the first computing platform associated with the first user, the second selection indicating a second binary interest for the second user based upon the second profile.

7. The system of claim 6, wherein the one or more physical computer processors are further configured to:

responsive to the first user and the second user being mutually interested, receive an input from the first computing platform for the second user; and effectuate transmission of the input to the second client computing platform.

8. The system of claim 7, wherein the one or more physical computer processors are further configured to:
in response to the input from the first computing platform, obtain a third video segment captured by the second computing platform;
obtain a third capture date associated with the third video segment, the third capture date indicating a date when the third video segment was captured;
verify that the third capture date is within the threshold time period from current time; and
responsive to the third capture date being verified to be no older than the threshold time period, effectuate transmission of the third video segment to the first computing platform.

9. The system of claim 8, wherein the one or more physical computer processors are further configured to:
display the third video segment via the online platform.

10. A method for verifying how old a video segment is and for displaying the video segment via an online platform, the method comprising:
providing a first set of questions to elicit a response from a first user;
in response to a selection, from a first client computing platform associated with the first user, of at least one question from the first set of questions, obtaining a first video segment captured by the first client computing platform;
obtaining a first capture date associated with the first video segment, the first capture date indicating a date when the first video segment was captured;
verifying that the first capture date is within a threshold time period from current time;
responsive to the first capture date being verified to be no older than the threshold time period;
associating the first video segment with a first profile that is associated with the first user;
displaying at least a portion of the first profile including the first video segment via the online platform such that a second user can view the first profile; and
receiving a first selection from a second client computing platform associated with the second user viewing the first profile, the first selection indicating a binary interest for the first user based upon the first profile and
responsive to the first capture date being verified to be older than the threshold time period:
dissociating the first video segment with the first profile; and
removing at least a portion of the first profile such that the first user is notified that the first capture date is older than the threshold time period.

11. The method of claim 10, wherein the first video segment is recorded via the online platform.

12. The method of claim 10, wherein the first video segment is obtained from a repository of video segments.

13. The method of claim 10, wherein displaying at least the portion of the first profile includes displaying the first capture date of the first video segment.

14. The method of claim 10, wherein the binary interest includes interested or uninterested.

15. The method of claim 14, further comprising:
providing a second set of questions to elicit a response from the second user;
in response to a selection, from the second client computing platform associated with the second user, of at least one question from the second set of questions, obtaining a second video segment captured by the second client computing platform;
obtaining a second capture date associated with the second video segment, the second capture date indicating a date when the second video segment was captured;
verifying that the second capture date is within the threshold time period from current time;
responsive to the second capture date being verified to be no older than the threshold time period:
associating the second video segment with a second profile that is associated with the second user;
displaying at least a portion of the second profile including the second video segment via the online platform such that the first user can view the second profile; and
receiving a second selection from the first client computing platform associated with the first user, the second selection indicating a second binary interest for the second user based upon the second profile.

16. The method of claim 15, further comprising:
responsive to the first user and the second user being mutually interested, receiving an input from the first client computing platform for the second user; and
effectuate transmission of the input to the second client computing platform.

17. The method of claim 16, wherein the one or more physical computer processors are further configured to:
in response to the input from the first client computing platform, obtaining a third video segment captured by the second client computing platform;
obtaining a third capture date associated with the third video segment, the third capture date indicating a date when the third video segment was captured;
verifying that the third capture date is within the threshold time period from current time; and
responsive to the third capture date being verified to be no older than the threshold time period, effectuate transmission of the third video segment to the first client computing platform.

18. The method of claim 17, further comprising:
displaying the third video segment via the online platform.

* * * * *